United States Patent
Albers et al.

(10) Patent No.: US 11,385,057 B2
(45) Date of Patent: Jul. 12, 2022

(54) EXTRA THICK ULTRAVIOLET DURABILITY COATING

(71) Applicant: Honeywell International Inc., Morris Plains, NJ (US)

(72) Inventors: Steven C. Albers, Coon Rapids, MN (US); Dean Eivind Johnson, Orono, MN (US); Randy Ramberg, Roseville, MN (US)

(73) Assignee: Honeywell International Inc., Charlotte, NC (US)

( * ) Notice: Subject to any disclaimer, the term of this patent is extended or adjusted under 35 U.S.C. 154(b) by 131 days.

(21) Appl. No.: 16/577,850

(22) Filed: Sep. 20, 2019

(65) Prior Publication Data

US 2021/0088336 A1  Mar. 25, 2021

(51) Int. Cl.
*G01C 19/66* (2006.01)
*G02B 5/08* (2006.01)

(52) U.S. Cl.
CPC .......... *G01C 19/662* (2013.01); *G01C 19/665* (2013.01); *G02B 5/0833* (2013.01)

(58) Field of Classification Search
CPC .... G02B 5/0858; G02B 5/285; G02B 5/0833; G02B 1/14; G01C 19/661; H01S 3/08059; H01S 3/083
See application file for complete search history.

(56) References Cited

U.S. PATENT DOCUMENTS

| | | | | |
|---|---|---|---|---|
| 5,513,039 A | * | 4/1996 | Lu | G02B 5/0833 359/359 |
| 5,646,780 A | * | 7/1997 | Crook | G02B 5/0833 359/584 |
| 7,760,432 B2 | | 7/2010 | Ramberg et al. | |
| 2008/0137706 A1 | * | 6/2008 | Anderson | G01C 19/661 372/99 |
| 2014/0198306 A1 | | 7/2014 | Yakunin et al. | |
| 2019/0324175 A1 | * | 10/2019 | Albers | G02B 5/285 |

FOREIGN PATENT DOCUMENTS

EP        626597 A1 * 11/1994 ........... G02B 5/0833

OTHER PUBLICATIONS

Albers, Steven C. et al., "Methods for Enhancing the Durability and Manufacturability of Multilayer Interference Mirrors"; U.S. Appl. No. 15/956,672, filed Apr. 18, 2018; pp. 1-12; Published: US.

* cited by examiner

*Primary Examiner* — Hwa Andrew Lee
(74) *Attorney, Agent, or Firm* — Fogg & Powers LLC

(57) ABSTRACT

Systems and methods for embodiments having an extra thick ultraviolet durability coating are described herein. For example, a system may include a laser block assembly. The system may also include a cavity in the laser block assembly. Further, the system may include a plurality of multilayer mirrors in the cavity. In certain embodiments, at least one multilayer mirror of the plurality of multilayer mirrors may include a plurality of alternating layers of a first optical material having a high index of refraction and a second optical material having a first low index of refraction. Additionally, the at least one multilayer mirror may include a multilayer durability coating disposed on the plurality of alternating layers.

13 Claims, 3 Drawing Sheets

EXTRA THICK ULTRAVIOLET DURABILITY COATING

BACKGROUND

A ring laser gyroscope (RLG) typically includes a solid block of dielectric material having a plurality of interconnected passages that are arranged in a closed loop to create a resonant cavity. Reflective surfaces are positioned at the intersection of each of the passages, and a lasing gas is contained within the resonant cavity. Electrical potentials applied to the lasing gas generate counter-propagating laser beams in the resonant cavity. Alternatively, counter-propagating laser beams may be introduced into the resonant cavity by an external laser source. The ring laser gyroscope detects the interference of the laser beams within the resonant cavity to determine changes in orientation and rate of turn.

In certain embodiments, the reflective surfaces (mirrors) are formed as stacks of alternating layers where adjacent layers have a large difference between their respective indexes of refraction. For example, a mirror may have alternating layers formed of $SiO_2$ and $ZrO_2$, where the $SiO_2$ has a low index of refraction and the $ZrO_2$ has a high index of refraction. By alternating the layers having a thickness of a ¼ wavelength of the laser beams that propagate within the RLG, the mirrors may reflect the laser beams such that the laser beams propagate around the resonant cavity.

SUMMARY

Systems and methods for embodiments having an extra thick ultraviolet durability coating are described herein. For example, a system may include a laser block assembly. The system may also include a cavity in the laser block assembly. Further, the system may include a plurality of multilayer mirrors in the cavity. In certain embodiments, at least one multilayer mirror of the plurality of multilayer mirrors may include a plurality of alternating layers of a first optical material having a high index of refraction and a second optical material having a first low index of refraction. Additionally, the at least one multilayer mirror may include a multilayer durability coating disposed on the plurality of alternating layers.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Embodiments for an extra thick ultraviolet durability coating are provided herein. In certain embodiments of a ring laser gyroscope, a He:Ne discharged laser beam, propagating within the gyroscope may contain a significant amount of ultraviolet spectral content. The ultraviolet spectral content may damage traditional mirrors found within ring laser gyroscopes. To better protect the mirrors within ring laser gyroscopes, an extra thick ultraviolet durability coating made from multiple layers may be applied to the mirrors to provide more robust UV protection for the underlying mirrors. In some embodiments, the extra thick top coat may be made from alternating layers of $SiO_2$ and $Al_2O_3$. Accordingly, the extra thick top coat may protect underlying mirrors from damage from ultraviolet radiation.

Figure 1:
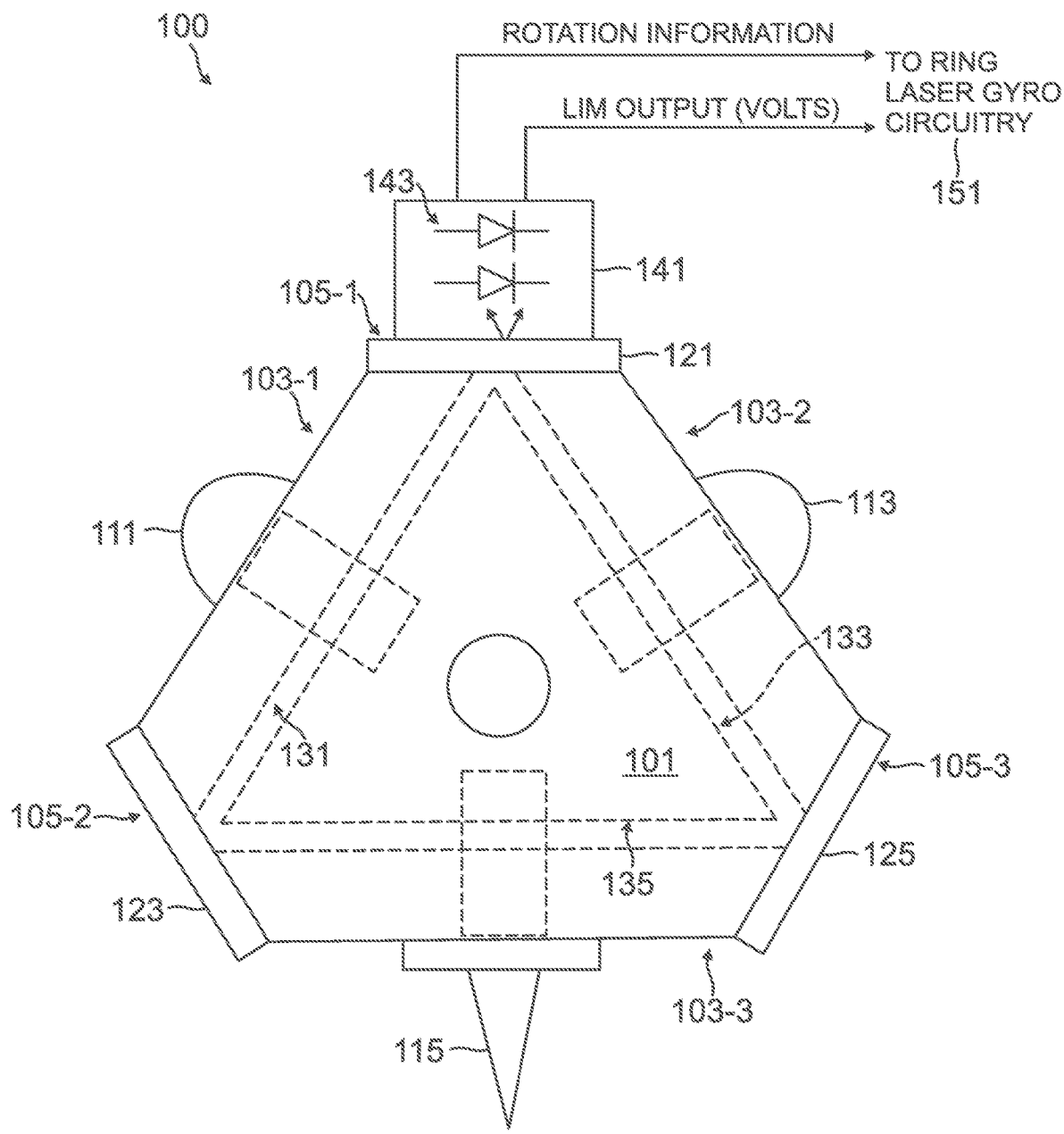
FIG. 1 is a simplified block diagram illustrating a ring laser gyroscope (RLG) that implements an extra thick ultraviolet durability coating according to an aspect of the present disclosure.

FIG. 1 is a simplified block diagram illustrating a ring laser gyroscope (RLG) 100, which may implement mirrors having extra-thick ultraviolet durability coatings, according to exemplary embodiments described herein. Referring to the example embodiment depicted in FIG. 1, the RLG 100 may include a laser block assembly 101 in which an interior cavity ring is formed. It should be understood that the term "ring" as used herein refers to a closed path that encloses an area and is not limited to circular closed paths. As shown, the interior cavity ring may be arranged as three connected channels 131, 133, and 135 that, when conjoined, form a triangular path. Lasers that propagate within the channels 131, 133, and 135 may propagate around the interior cavity ring. As shown, the laser block assembly 101 is triangular in shape having three sides 103-1, 103-2, and 103-3 and three blunted corners 105-1, 105-2, and 105-3. It should be understood that this is provided as a non-limiting example, as the laser block assembly 101 may be formed using one of multiple different shapes.

In certain embodiments, to aid the propagation of the lasers within the interior cavity ring, the RLG may include multiple mirrors 121, 123, and 125 to direct the lasers around the interior cavity ring. For example, the mirrors 121, 123, and 125 may be positioned at the corners 105-1, 105-2, and 105-3 of the laser block assembly 101, such that when a laser, propagating within a channel, is incident on one of the mirrors, the mirror may reflect the laser in such a way that the laser propagates through another channel. Thus, the combination of the mirrors 121, 123, and 125 with the channels 131, 133, and 135 direct lasers along a path through which a laser beam may propagate within the laser block assembly 101. While FIG. 1 depicts a path having three channels, other embodiments not depicted herein, may have more than three mirrors and three channels, where the mirrors and channels function substantially as described herein.

In some embodiments, the laser beams may be introduced into the channels. For example, the channels 131, 133, and 135 may be empty (for example, at some level of vacuum) or filled with an inert gas. In this embodiment, laser beams of a specific wavelength may be created and introduced into the channels 131, 133, and 135 through the use of an end pumped laser or other type of laser source that is mounted to one of the mirrors 121, 123, and 125, where one of the mirrors 121, 123, and 125 is partially reflective.

In other embodiments, a gas or combination of gases within the channels 131, 133, and 135 may be stimulated to produce laser beams that propagate within the interior cavity ring. For example, the channels 131, 133, and 135 may include a mixture of Helium-Neon (He:Ne) gas. During operation, a portion of the gas within the channels 131, 133, and 135 may be converted to a gain medium through the application of a current through the portion of the gas. In particular, the current induced across a portion of the gas may excite helium and neon atoms such that the excited helium atoms collide with the excited neon atoms, producing fluorescence and stimulated emissions. In certain embodiments, to induce the current across a portion of the gas, the RLG 100 may include a first cathode 111 disposed on a first side 103-1 of the laser block assembly 101, a second cathode 113 disposed on a second side 103-2 of the laser block assembly 101, and an anode 115 disposed on a third side 103-3 of the laser block assembly 101.

Whether the laser beams are introduced into the interior cavity ring through an external laser source or stimulated within the interior cavity ring, one or more laser beams may be repeatedly reflected around the interior cavity ring formed by the channels 131, 133, and 135 by the multilayer mirrors 121, 123, and 125. For example, the laser beams may propagate around the interior cavity ring in both a clockwise (CW) direction and a counterclockwise (CCW) direction. While the term "laser beam" is used herein to describe light propagating within the interior cavity ring, the light may be referred to by other names such as laser field, light field, optical beam, and the like.

In some embodiments, one of the multilayer mirrors (such as multilayer mirror 121, for example) may be attached to a read-out assembly 141. The performance of the RLG 100 may be observed by coupling optical energy from the interior cavity ring to the read-out assembly 141. The read-out assembly 141 may include at least two photodiodes 143. A portion of the light that is propagating within the interior cavity ring may be incident on the photodiodes 143 within the read-out assembly 141. Accordingly, the read-out assembly 141 receives optical energy as inputs and, as a function of the received optical energy, provides an output of one or more voltage signals to one or more processing elements within RLG circuitry 151. From the voltage signals, the RLG circuitry 151 may obtain rotation information. Additionally, the read-out assembly 141 may provide voltage signals that are correlated with a laser intensity signal that may be referred to as a laser intensity monitor (LIM) signal. The LIM signal voltage may provide information associated with the optical energy within the interior ring cavity. Using the rotation information and the LIM signal voltage, the RLG circuitry 151 may process the rotation information to facilitate the calculation of navigation information for an associated vehicle or other associated object.

In certain embodiments, the multilayer mirrors 121, 123, and 125 may be stacks of alternating layers of optical material where adjacent layers have a high difference between their respective indexes of refraction. For example, a mirror may have alternating layers of optical material, wherein the optical material includes $SiO_2$ and $ZrO_2$, where the $SiO_2$ has a low index of refraction and the $ZrO_2$ has a high index of refraction. By alternating layers having a thickness approximately equal to a ¼ wavelength of the laser beams propagating within the RLG, the mirrors 121, 123, 125 may reflect the laser beams such that the laser beams propagate around the interior cavity ring.

However, the multilayer mirrors 121, 123, and 125 may be exposed to high-energy plasma operating environments and ultraviolet (UV) radiation. The exposure to these environments may degrade the performance of the multilayer mirrors 121, 123, and 125 over the operational life of the RLG 100. For example, when the multilayer mirrors are made from various oxides, the UV radiation may reduce the oxide in the various refraction materials, inducing photochromic losses.

In embodiments, described below, the multilayer mirrors 121, 123, and 125 may have extra thick ultra-violet durability coatings formed from alternating layers of materials having different indexes of refraction, where the difference between the index of refractions for the durability coating is less than the difference for a multilayer mirror.

Figure 2:
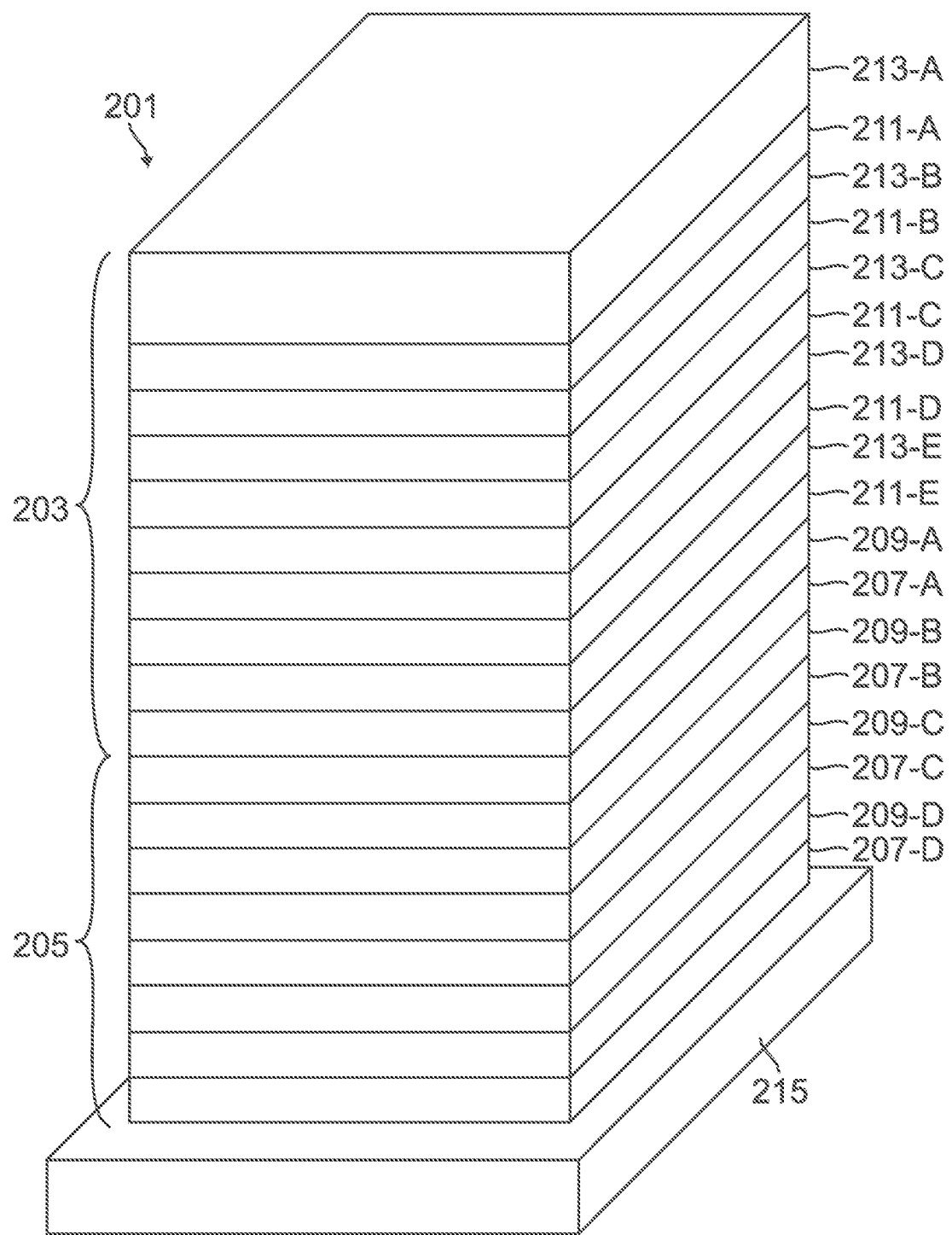
FIG. 2 is a simplified structural diagram illustrating a multilayer mirror that can be utilized according to an aspect of the present disclosure.

FIG. 2 is a block diagram illustrating the structure of a multilayer mirror 201 that includes a durability coating 203. As shown the multilayer mirror 201 may include a reflective portion 205 that is coated with a durability coating 203. As described herein, the durability coating may protect the reflective portion 205 of the multilayer mirror 201 from damage caused by ultraviolet radiation within an interior cavity ring of an RLG.

In certain embodiments, the reflective portion 205 of the multilayer mirror 201 may be a mirror that is commonly referred to as a multilayer dielectric coated mirror or as a multilayer high-reflectance coated mirror. To produce the reflective portion 205 of the multilayer mirror 201, the multilayer mirror may be formed by repeatedly depositing glass like substance or coatings (optical coatings) on a substrate 215. The deposition process may be a chemical vapor deposition process, a physical vapor deposition process, or some equivalent technique. Further, as the optical coatings are deposited, the layers may alternate between high refractive index optical coatings 209-A-209-D (referred to generally as high refractive index optical coating 209) and low refractive index optical coatings 207-A-207-D (referred to generally as low refractive index optical coating 207). For example, the high refractive index optical coatings 209-A-209-D may be deposited layers of Zirconium Oxide ($ZrO_2$), tantalum oxide, titanium oxide, or other material having similar physical properties, and the low refractive index optical coatings 207-A-207-D may be deposited layers of Silicon Dioxide ($SiO_2$), or other material having similar physical properties. Each high-index optical coating 209 deposited onto a low-index optical coating 207 may be referred to as a reflective pair, while the overall assembly is the reflective portion 205 of the multilayer mirror 201.

In some embodiments, each layer of the reflective portion 205 of the multilayer mirror 201 may have a thickness substantially equal to a quarter wavelength of the light to be reflected by the multilayer mirror 201. Also, while only four reflective pairs are shown in the reflective portion 205 of the multilayer mirror 201, the reflective portion 205 may have more or less pairs than shown in the illustrated reflective portion 205.

In further embodiments, as the reflective portion 205 is susceptible to damage from ultraviolet radiation, the reflective portion 205 may have a thick durability coating 203 formed thereon. The durability coating 203 may be formed from similar processes used to form the reflective portion 205. For example, the layers of the durability coating 203 may be formed using a chemical vapor deposition process, a physical vapor deposition process, or some equivalent technique. Also, similar to the reflective portion 205, the durability coating may be formed from alternating layers. However, the composition of the alternating layers is different from the alternating high and low index of refraction layers found in the reflective portion 205.

In certain embodiments, the alternating layers of the durability coating 203 include low index of refraction layers 213-A-213-E (referred to generally as a low index of refraction layer 213) and medium index of refraction layers 211-A-211-E (referred to generally as a medium index of refraction layer 211). In some implementations, a low index of refraction layer 213 may be made from the same material as the low index of refraction layers 207 found in the reflective portion 205. For example, the low index of refraction layers 213 may be fabricated from $SiO_2$. Additionally, the medium index of refraction layers 211 may be composed of material having an index of refraction that is between the low index of refractions layers 207 and 213 but less than the index of refraction of the high index of refraction layers 209. Also, the material used for the medium index of refraction layers 211 may be composed of material that is able to adequately absorb ultraviolet radiation. For example, the medium index of refraction layers 211 may be fabricated from $Al_2O_3$ due to the ability of $Al_2O_3$ to absorb ultraviolet radiation while having the desired index of refraction. Alternatively, the medium index of refraction layers 211 may be fabricated from Titania or other material having similar characteristics.

In certain embodiments, the thickness of each of the low index of refraction layers 213 or medium index of refraction layers 211 may be a multiple of a quarter wavelength of the light propagating within the interior cavity ring. For example, the layers may each be a quarter wavelength thick, a half wavelength thick, a combination of quarter wavelength and half wavelength thick layers, or have a thickness greater than a half wavelength. The combination of different thicknesses for the layers may be used to tune the durability coating 203 to the desired absorption of ultraviolet radiation while still allowing the underlying reflective portion 205 to have the desired reflectivity. In some examples, the different layers of the durability coating are each a quarter wavelength thick save the top layer, which may be a low index of refraction layer 213 and have a thickness of half a wavelength. In some embodiments, the durability coating 203 both increases reflectivity while also providing ultraviolet protection for the reflective portion 205.

Figure 3:
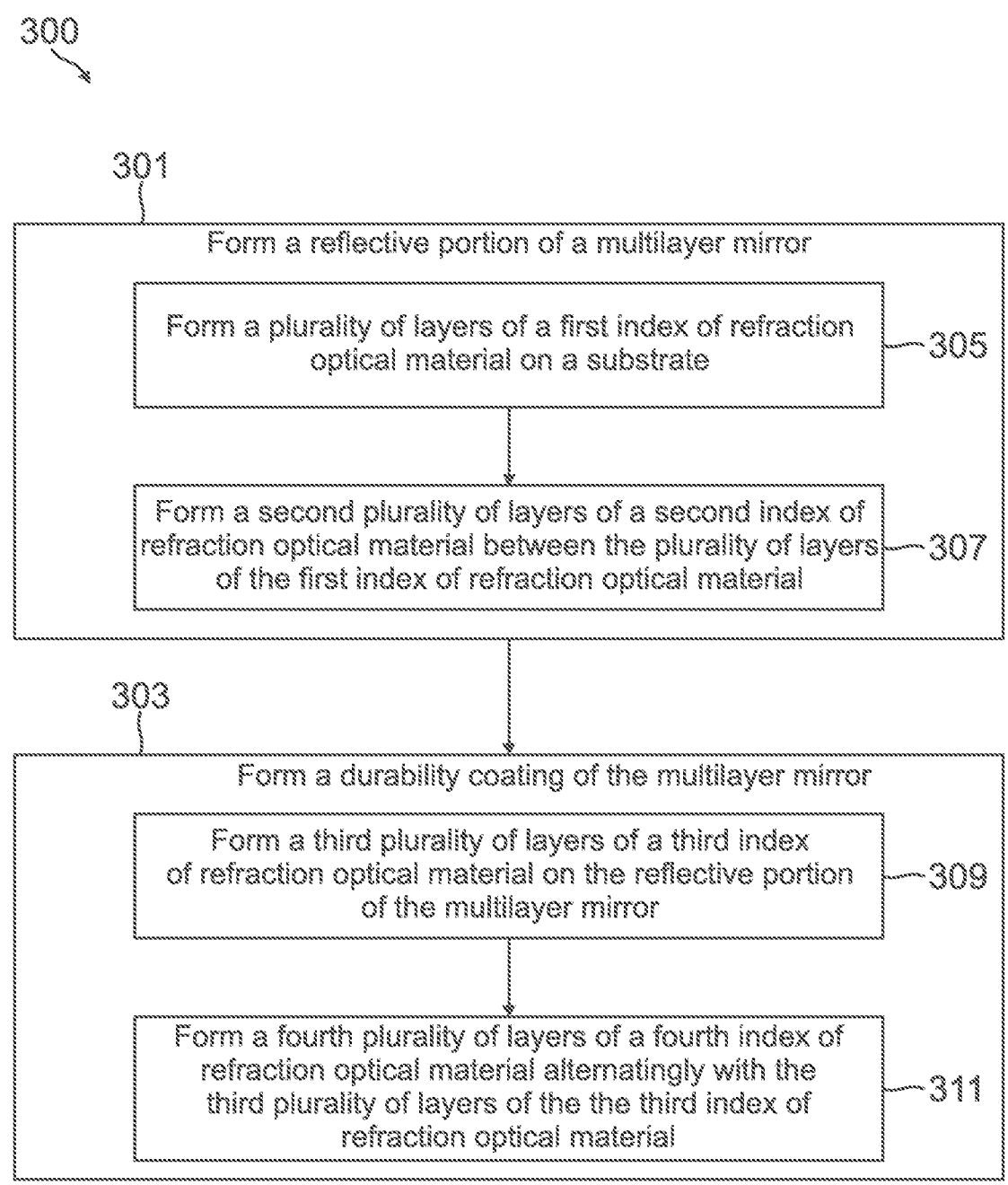
FIG. 3 is a flow diagram illustrating a method for forming a multilayer mirror having an extra thick ultraviolet durability coating according to an aspect of the present disclosure.

FIG. 3 is a flowchart diagram of a method 300 for fabricating a multilayer mirror having an extra thick durability coating. The method 300 proceeds at 301, where a reflective portion of a multilayer mirror is formed. To form the reflective portion of the multilayer mirror, the method 300 proceeds at 305, where a plurality of layers of a first index of refraction optical material are formed. Additionally, when forming the reflective portion of the multilayer mirror, the method 300 proceeds at 307, where a second plurality of layers of a second index of refraction optical material are formed between the plurality of layers of the first index of refraction optical material.

In additional embodiments, after forming the reflective portion of the multilayer mirror, the method 300 proceeds at 303 where a durability coating of the multilayer mirror is formed. To form the durability coating, the method 300 proceeds at 309, where a third plurality of layers of a third index of refraction optical material are formed on the reflective portion of the multilayer mirror. When the third plurality of layers are formed, the method 300 proceeds at 311, where a fourth plurality of layers of a fourth index refraction optical material are alternatingly formed with the third plurality of layers of the third index of refraction optical material. In certain embodiments, the third index of refraction optical material has an index of refraction greater than the first index of refraction optical material in the fourth index of refraction optical material but less than the second index of refraction optical material.

EXAMPLE EMBODIMENTS

Example 1 includes a device, comprising: a plurality of alternating layers of a first optical material having a high index of refraction and a second optical material having a low index of refraction; and a durability coating of multiple layers of optical material disposed on the plurality of alternating layers, wherein a plurality of the multiple layers of optical material absorb ultraviolet light.

Example 2 includes the device of Example 1, wherein the multiple layers of optical material comprise multiple alternating layers of a third optical material having a medium index of refraction and a fourth optical material having a second low index of refraction, wherein the medium index of refraction is between the second low index of refraction and the high index of refraction.

Example 3 includes the device of Example 2, wherein the fourth optical material and the second optical material are the same material.

Example 4 includes the device of any of Examples 2-3, wherein the thickness of multiple alternating layers are a combination of quarter wavelength thick and half wavelength thick layers.

Example 5 includes the device of any of Examples 2-4, wherein a top layer of the fourth optical material is a half wavelength thick.

Example 6 includes the device of any of Examples 2-5, wherein the third optical material is aluminum oxide.

Example 7 includes the device of any of Examples 2-6, wherein the fourth optical material is silicon oxide.

Example 8 includes the device of any of Examples 1-7, wherein the first optical material is zirconium oxide.

Example 9 includes the device of any of Examples 1-8, wherein the second optical material is silicon oxide.

Example 10 includes the device of any of Examples 1-9, wherein the plurality of alternating layers and the durability coating form a multilayer reflective mirror within a laser cavity in a ring laser gyroscope.

Example 11 includes a system, comprising: a laser block assembly; a cavity in the laser block assembly; and a plurality of multilayer mirrors in the cavity, wherein at least one multilayer mirror of the plurality of multilayer mirrors comprises: a plurality of alternating layers of a first optical material having a high index of refraction and a second optical material having a first low index of refraction; and a multilayer durability coating disposed on the plurality of alternating layers.

Example 12 includes the system of Example 11, wherein the multilayer durability coating comprises multiple alternating layers of a third optical material having a medium index of refraction and a fourth optical material having a second low index of refraction, wherein the medium index of refraction is between the second low index of refraction and the high index of refraction.

Example 13 includes the system of Example 12, wherein the fourth optical material and the second optical material are the same material.

Example 14 includes the system of any of Examples 12-13, wherein the multiple alternating layers are a combination of quarter wavelength thick and half wavelength thick layers.

Example 15 includes the system of any of Examples 12-14, wherein a top layer of the fourth optical material is a half wavelength thick.

Example 16 includes a method, comprising forming a reflective portion of a multilayer mirror, comprising: forming a plurality of layers of a first index of refraction optical material on a substrate; forming a second plurality of layers of a second index of refraction optical material between the plurality of layers of the first index of refraction optical material; and forming a durability coating of the multilayer mirror, comprising: forming a third plurality of layers of a third index of refraction optical material on the reflective portion of the multilayer mirror; and forming a fourth plurality of layers of a fourth index of refraction optical material alternatingly with the third plurality of layers of the third index of refraction optical material, wherein the third index of refraction optical material has an index of refraction greater than the first index of refraction optical material and the fourth index of refraction optical material but less than the second index of refraction optical material.

Example 17 includes the method of Example 16, wherein the fourth index of refraction optical material and the second index of refraction optical material are the same material.

Example 18 includes the method of any of Examples 16-17, wherein the third plurality of layers and the fourth plurality of layers are a combination of quarter wavelength thick and half wavelength thick layers.

Example 19 includes the method of any of Examples 16-18, wherein a top layer of the fourth index of refraction optical material is a half wavelength thick.

Example 20 includes the method of any of Examples 16-19, wherein the third plurality of layers are made of aluminum oxide.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof. Further, while the durability coating 203 shown has ten different layers, the durability coating 203 may have more or less pairs of the high index of refraction layers 211 and the low index of refraction layers 213 shown in FIG. 2.

What is claimed is:

1. A device, comprising:
   a plurality of alternating layers of a first optical material having a high index of refraction and a second optical material having a low index of refraction; and
   an ultraviolet durability coating configured to protect the plurality of alternating layers from ultraviolet radiation, wherein the ultraviolet durability coating comprises multiple pairs of alternating layers of optical material disposed on the plurality of alternating layers, wherein a plurality of layers in the multiple pairs of alternating layers of optical material absorb ultraviolet light, wherein at least one pair in the multiple pairs of alternating layers is a combination of quarter wavelength thick and half wavelength thick layers.

2. The device of claim 1, wherein the multiple pairs of alternating layers of optical material comprise multiple alternating layers of a third optical material having a medium index of refraction and a fourth optical material having a second low index of refraction, wherein the medium index of refraction is between the second low index of refraction and the high index of refraction.

3. The device of claim 2, wherein the fourth optical material and the second optical material are the same material.

4. The device of 1, wherein a top layer of the fourth optical material is a half wavelength thick.

5. The device of claim 2, wherein the third optical material is aluminum oxide.

6. The device of claim 2, wherein the fourth optical material is silicon oxide.

7. The device of claim 1, wherein the first optical material is zirconium oxide.

8. The device of claim 1, wherein the second optical material is silicon oxide.

9. The device of claim 1, wherein the plurality of alternating layers and the ultraviolet durability coating form a multilayer reflective mirror within a laser cavity in a ring laser gyroscope.

10. A system, comprising:
    a laser block assembly;
    a cavity in the laser block assembly; and
    a plurality of multilayer mirrors in the cavity, wherein at least one multilayer mirror of the plurality of multilayer mirrors comprises:
       a plurality of alternating layers of a first optical material having a high index of refraction and a second optical material having a first low index of refraction; and
       a ultraviolet durability coating configured to protect the plurality of alternating layers from ultraviolet radiation, wherein the ultraviolet durability coating comprises multiple pairs of alternating layers of optical material disposed on the plurality of alternating layers, wherein a plurality of layers in the multiple pairs of alternating layers of optical material absorb ultraviolet light, wherein at least one pair in the multiple pairs of alternating layers is a combination of quarter wavelength thick and half wavelength thick layers.

11. The system of claim 10, wherein the ultraviolet durability coating comprises multiple alternating layers of a third optical material having a medium index of refraction and a fourth optical material having a second low index of refraction, wherein the medium index of refraction is between the second low index of refraction and the high index of refraction.

12. The system of claim 11, wherein the fourth optical material and the second optical material are the same material.

13. The system of claim 11, wherein a top layer of the fourth optical material is a half wavelength thick.

* * * * *